(12) United States Patent
Auxier et al.

(10) Patent No.: US 11,334,051 B2
(45) Date of Patent: May 17, 2022

(54) SYSTEMS AND METHODS FOR AUTOMATED ADAPTIVE MANUFACTURING OF AIRFOIL CASTINGS

(71) Applicant: UNITED TECHNOLOGIES CORPORATION, Farmington, CT (US)

(72) Inventors: James Tilsley Auxier, Bloomfield, CT (US); Alan C. Barron, Jupiter, FL (US); Norman W. Cofalka, Bernardsville, NJ (US); Joel H. Wagner, Wethersfield, CT (US)

(73) Assignee: Raytheon Technologies Inc., Farmington, CT (US)

( * ) Notice: Subject to any disclaimer, the term of this patent is extended or adjusted under 35 U.S.C. 154(b) by 464 days.

(21) Appl. No.: 16/446,463

(22) Filed: Jun. 19, 2019

(65) Prior Publication Data
US 2019/0391559 A1   Dec. 26, 2019

Related U.S. Application Data

(60) Provisional application No. 62/688,928, filed on Jun. 22, 2018.

(51) Int. Cl.
*G05B 19/4097* (2006.01)
*F01D 5/14* (2006.01)

(52) U.S. Cl.
CPC ......... *G05B 19/4097* (2013.01); *F01D 5/147* (2013.01); *F05D 2220/32* (2013.01); *F05D 2230/21* (2013.01); *G05B 2219/35134* (2013.01); *G05B 2219/45147* (2013.01)

(58) Field of Classification Search
CPC ...... G05B 19/4097; G05B 2219/35134; G05B 2219/45147; F01D 5/147; F05D 2220/32; F05D 2230/21
See application file for complete search history.

(56) References Cited

U.S. PATENT DOCUMENTS

| 8,442,665 B2 | 5/2013 | Krause |
| 9,358,645 B2 | 6/2016 | Louesdon |
| 2004/0262277 A1* | 12/2004 | Mika ............ F01D 21/003 219/121.85 |

(Continued)

FOREIGN PATENT DOCUMENTS

EP   1457853   9/2004

OTHER PUBLICATIONS

International Preliminary Report on Patentability and Written Opinion of the International Search Authority dated Dec. 22, 2020 in Application No. PCT/US2019/038047.

(Continued)

*Primary Examiner* — Thomas C Lee
*Assistant Examiner* — Ameir Myers
(74) *Attorney, Agent, or Firm* — Snell & Wilmer L.L.P.

(57) ABSTRACT

A system for automated adaptive manufacturing of airfoil castings is disclosed. The system may receive a three dimensional scan of a work piece. The system may compare the three dimensional scan to a digital model of the work piece. The system may identify an area of dimensional abnormality on the work piece based on the comparison. The system may alter the area of dimensional abnormality on the work piece.

20 Claims, 5 Drawing Sheets

(56) References Cited

U.S. PATENT DOCUMENTS

| | | | |
|---|---|---|---|
| 2005/0201611 A1* | 9/2005 | Lloyd | F01D 5/141 |
| | | | 382/152 |
| 2014/0088746 A1 | 3/2014 | Maloney et al. | |
| 2014/0336806 A1* | 11/2014 | Bewlay | G01B 21/04 |
| | | | 700/98 |
| 2016/0109876 A1 | 4/2016 | Addicott | |
| 2016/0349729 A1 | 12/2016 | Fenkl et al. | |
| 2017/0226860 A1 | 8/2017 | Aschermann et al. | |
| 2019/0156472 A1* | 5/2019 | Link | G06T 7/75 |
| 2019/0238796 A1* | 8/2019 | Allen | G06T 7/0004 |
| 2019/0258225 A1* | 8/2019 | Link | G06T 7/70 |
| 2020/0151290 A1* | 5/2020 | Konakovic-Lukovic | |
| | | | G06F 30/17 |

OTHER PUBLICATIONS

International Searching Authority, International Search Report dated Jan. 17, 2020 in Application No. PCT/US2019/038047.
European Patent Office, European Supplementary Search Report dated Feb. 16, 2022 in Application No. 19845077.7.

* cited by examiner

SYSTEMS AND METHODS FOR AUTOMATED ADAPTIVE MANUFACTURING OF AIRFOIL CASTINGS

CROSS REFERENCE TO RELATED APPLICATIONS

This application claims priority to and benefit of U.S. Provisional Application No. 62/688,928, entitled "SYSTEMS AND METHODS FOR AUTOMATED ADAPTIVE MANUFACTURING OF AIRFOIL CASTINGS," which was filed on Jun. 22, 2018. All the contents of the previously identified application are hereby incorporated by reference for any purpose in their entirety.

FIELD

The disclosure relates generally to airfoils in gas turbine engines and systems and methods for manufacturing airfoil castings.

BACKGROUND

Gas turbine engine airfoils are often manufactured from castings tending to benefit from final machining for mating to attachment and adjacent surfaces. The investment casing process of super alloys, both in equiax and Directionally Solidified (DS)/single crystal methods, employs a variety of support, gating, and printout features enabling desirable design elements of the part. However, the addition of support, gating, and printout features tend to result in surface irregularities benefiting from removal thereby tending to increase cycle time, manual-touch labor, and environmental health and safety challenges. Additionally, removal of these features after production of the rough casting tends to induce part-to-part dimensional inconsistencies. These dimensional inconsistencies are exacerbated by conventional manual methods of removal such as, for example, belt grinding and other hand working. Furthermore, traditional hard-coded robotic or Computer Numerical Control (CNC) methods of removal are unsuited to feature removal operations due to the inherent part-to-part variance in the rough castings resulting from the features mentioned above.

SUMMARY

In various embodiments, systems, methods, and articles of manufacture (collectively, the "system") for automated adaptive manufacturing of airfoil castings are disclosed. In various embodiments, the system may receive a three dimensional scan of a work piece. The system may compare the three dimensional scan to a digital model of the work piece. The system may identify areas of dimensional abnormality on the work piece based on the comparison. The system may alter the areas of dimensional abnormality on the work piece.

In various embodiments, the system may also positionally register the three dimensional scan against an ideal model of the work piece, generate a conformal-mapped nominal model of the work piece based on the three dimensional scan and a conformal-mapping model, and store the conformal-mapped nominal model as model data. The system may compare the conformal-mapped nominal model with the three dimensional scan, generate a difference map based on the comparison, and store the difference map as model data. The system may classify the difference map into a positive feature set and a negative feature set, match the positive feature set and the negative feature set against an index of features to generate a matched feature set, and store the matched feature set as match data. The system may generate a tool instruction based on the match data and transmit the tool instruction to a computer numerical control tool system. In various embodiments the conformal-mapping model proportionally adjusts the dimensions of an ideal airfoil model. The system may derive the conformal-mapping model in response to a plurality of three dimensional scan data.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
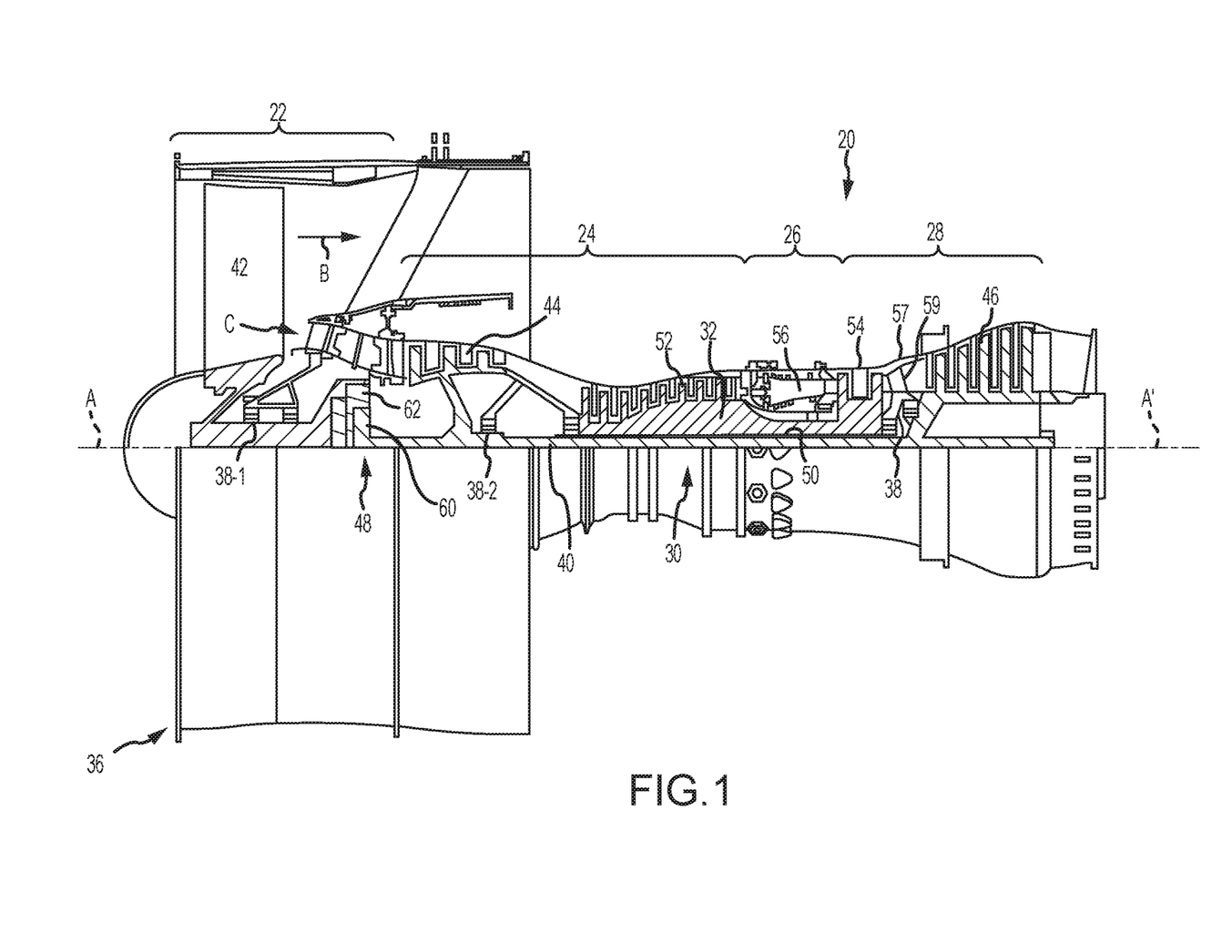
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46 and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, each of the LPC 44, HPC 52, HPT 54, and LPT 46 may comprise alternating rows of rotating rotors and stationary stators comprising airfoils. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, the compressor rotors may be configured to compress and spin a fluid flow. Stators may be configured to receive and straighten the fluid flow. In operation, the fluid flow discharged from the trailing edge of stators may be turned toward the axial direction or straightened (e.g., the flow may be directed in a substantially parallel path to or directed toward the centerline of the engine and/or HPC) to increase and/or improve the efficiency of the engine and, more specifically, to achieve maximum and/or near maximum compression and efficiency when the straightened air is compressed and spun by a rotor.

In various embodiments, the turbine rotors may be configured to expand and reduce the swirl of the fluid flow. Stators may be configured to receive and turn the fluid flow. In operation, the fluid flow discharged from the trailing edge of stators may be turned away from the axial direction (e.g., the swirled flow may be directed substantially away from the centerline of the engine and/or HPC) to enable the extraction of shaft power from the fluid and, more specifically, to achieve maximum and/or near maximum expansion of the fluid and efficiency when the swirled air is expanded by the turbine rotor.

Figure 2:
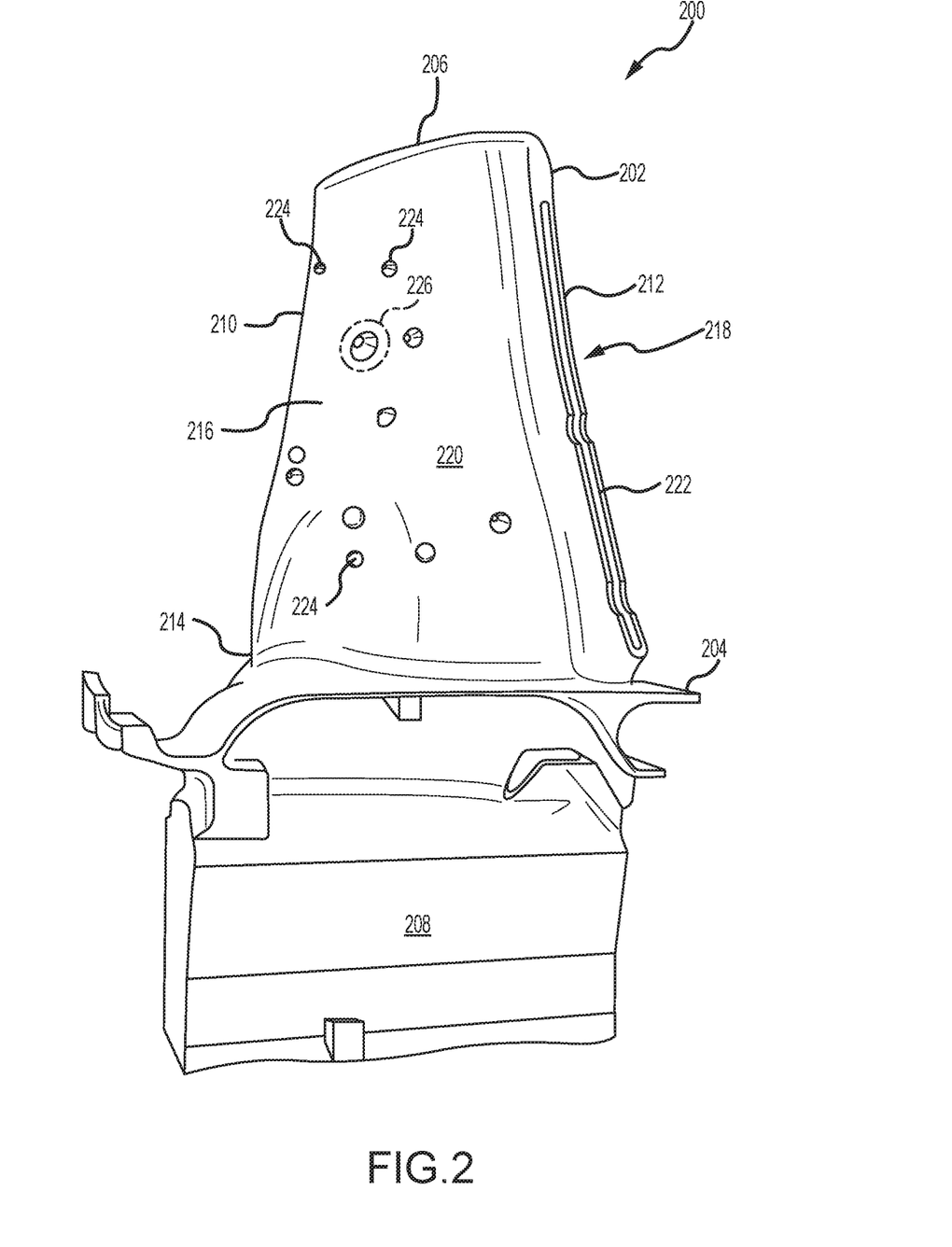
FIG. 2 illustrates a rough cast airfoil, in accordance with various embodiments.

According to various embodiments and with reference to FIG. 2, an exemplary cast airfoil 200 is illustrated as a rough cast taken at the end of "lost wax" casting operations employing any of a variety of support, gating, and printout features and/or the like. Cast airfoil 200 comprises a blade 202 which extends from a platform 204 and a base 208 relatively beneath the platform 204. The intersection between the blade 202 and the platform 204 defines a root 214 of the blade 202. Blade 202 has a chord defined between leading edge 210 and trailing edge 212, a span defined between the root 214 and a tip 206, and a section defined between a suction side 216 and a pressure side 218 opposite the suction side. The span, the chord, and the section describe the complex curves of the blade surface 220. An encapsulation 222 of material which is to be removed may be present protecting trailing edge features. In various embodiments, positive features such as a plurality of casting artifacts 224 (which may result from employing the various support, gating, and printout features during casting) extend from the blade surface 220. In various embodiments, negative features such as dimples 226 may be present and define areas of relatively local concavity in the blade surface 220.

Figure 3:
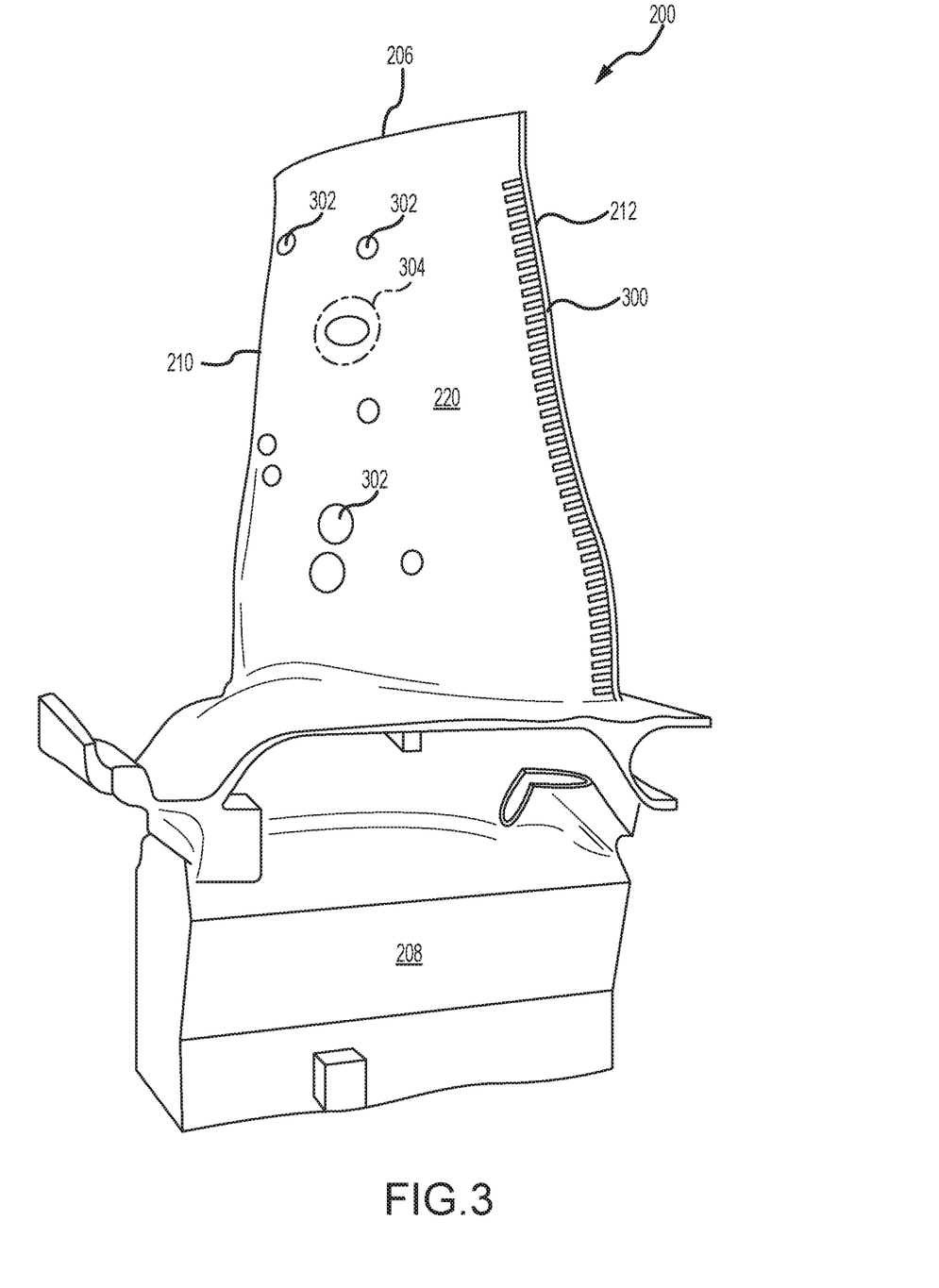
FIG. 3 illustrates a rough cast airfoil modified by a system for automated adaptive manufacturing, in accordance with various embodiments.

According to various embodiments and with reference to FIG. 3, the cast airfoil 200 is illustrated after manufacturing according to the methods described herein. Encapsulation 222 is removed to expose trailing edge features 300. Positive features 302 (e.g., casting artifacts 224) are machined flush with blade surface 220 and negative features 304 (e.g., dimples 226) have material added or added and machined flush with blade surface 220.

Figure 4:
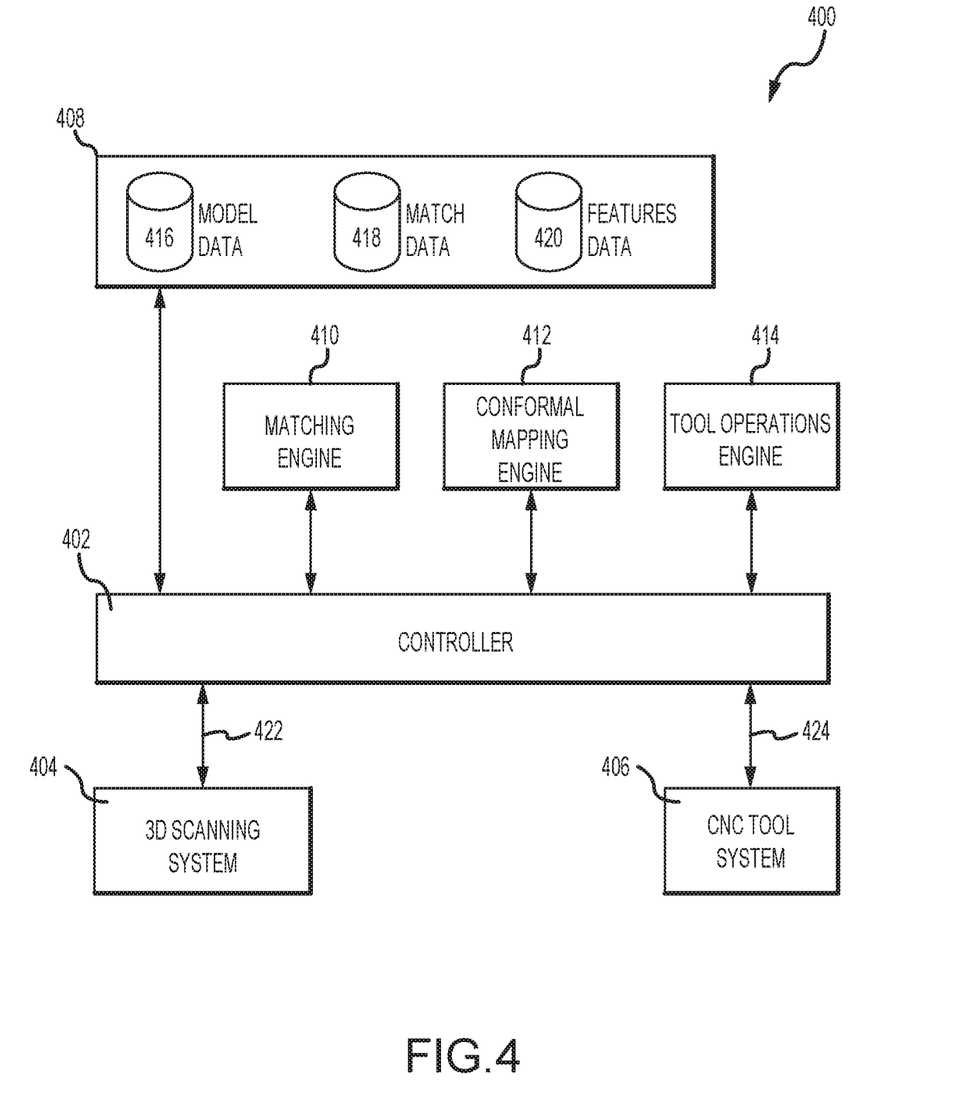
FIG. 4 illustrates a system for automated adaptive manufacturing of airfoil castings, in accordance with various embodiments.

In various embodiments and with reference now to FIG. 4 a system 400 may comprise a controller 402, a three dimensional (3D) scanning system 404, and a Computer Numerical Control (CNC) tool system 406. In various embodiments system 400 may further comprise a matching engine 410, a conformal-mapping engine 412, a tool operations engine 414, and a database 408. Any of these components may be outsources and/or be in communication with controller 402 via a network. System 400 may be computer based, and may comprise a processor, a tangible non-transitory computer-readable memory, and/or a network interface, along with other suitable system software and hardware components. Instructions stored on the tangible non-transitory memory may allow system 400 to perform various functions, as described herein.

In various embodiments, controller 402 may be configured as a central network element or hub to access various systems, engines, and components of system 400. Controller 402 may comprise a network, computer-based system, and/ or software components configured to provide an access point to various systems, engines, and components of system 400. Controller 402 may be in operative and/or electronic communication with 3D scanning system 404, CNC tool system 406, matching engine 410, conformal-mapping engine 412, tool operations engine 414, and/or database 408.

In various embodiments, 3D scanning system 404 may comprise hardware and/or software configured to create a three dimensional scan of a work piece such as cast airfoil 200. 3D scanning system 404 may comprise, for example, a coordinate measuring machine, a contact probe, a structured light scanner, a modulated light scanner, a laser scanner, and/or the like. 3D scanning system 404 may be configured to communicate with controller 402 and to generate and transmit a scan data, such as a point cloud 422, to controller 402.

In various embodiments, CNC tool system 406 may comprise hardware and/or software configured to perform additive or subtractive manufacturing operations on a work piece such as cast airfoil 200 in response to instructions from a controller. CNC tool system 406 may be configured to communicate with controller 402 and receive tool instructions 424 from controller 402. CNC tool system 406 may comprise, for example, a grinding machine, a lathe, a milling machine, an electron beam welding machine, a 3D printing machine, an electrical discharge manufacturing machine, and/or the like. In various embodiments, a tool instruction may comprise data such as instructions for CNC tool paths, G-codes, M-codes, layered additive programs, and/or the like.

In various embodiments, database 408 may comprise any number of data elements or data structures such as model data 416, match data 418, and features data 420. Database 408 may be configured to store data using any suitable technique described herein or known in the art. Database 408 may be configured to store digital models and data related to digital models of a work piece as model data 416. Model data 416 may comprise data such as accurate dimensional data, point clouds 422, an ideal airfoil model, a nominal airfoil model, and a conformal-mapped nominal airfoil model, or a difference map. Features data 420 may comprise data related to dimensional abnormalities of a work piece such as dimensional data, an index of features comprising a positive feature set and a negative feature set, or tool instructions.

Figure 5:
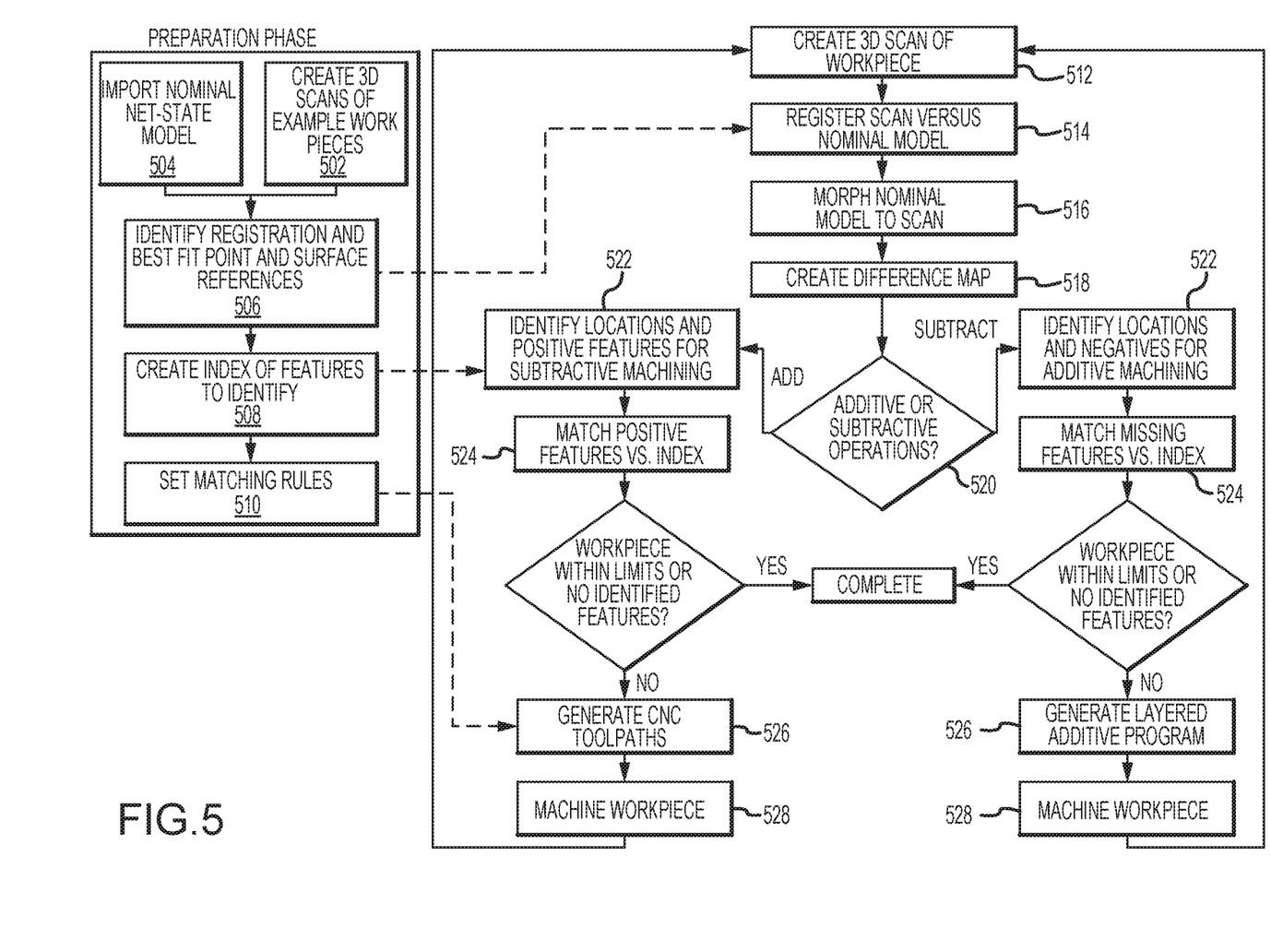
FIG. 5 illustrates a process flow for automated adaptive manufacturing of airfoil castings, in accordance with various embodiments.

In various embodiments and with additional reference to FIG. 5, controller 402 may receive a plurality of scan data from 3D scanning system 404 (step 502). The plurality of scan data may comprise a variety of point clouds 422 corresponding to a plurality of rough cast airfoils. Each of the plurality of rough cast airfoils may vary in chord, span, and section as may result from variance in the casting process. Controller 402 may import a nominal net state model (step 504) such as, for example, an ideal airfoil model. Controller 402 may identify a registration and best fit point and may identify surface references (step 506). Controller 402 may compare the plurality of scan data with the ideal airfoil model and derive a conformal-mapping model which may describe a function of the casting process variance with respect to the ideal airfoil model. The conformal-mapping model may proportionally adjust the dimensions of the ideal airfoil model to a best surface fit of a surface of a cast airfoil, such as blade surface 220. In various embodiments, the conformal-mapping model may be generated or derived by a machine learning technique such as, for example, one of a supervised deep learning technique or an unsupervised deep learning technique applied to the plurality of scan data.

Controller 402 may derive an index of features to identify (step 508). Controller 402 may apply the conformal-mapping model to the plurality of scan data and identify outlying surface regions such as encapsulations 222, casting artifacts 224, and/or dimples 226. Stated another way, for each of a plurality of rough cast airfoils, controller 402 may identify areas of dimensional abnormality or non-conformity in a point cloud of each of the rough cast airfoil by comparison to an output of a conformal-mapping model (i.e., a conformal-mapped nominal model) applied to the point cloud. The comparison between the conformal-mapped nominal model of each of the plurality of scan data may be used to generate a difference map between the conformal-mapped nominal model and the scan data. From each of the difference maps, identified areas of dimensional abnormality may be segregated in a positive feature set and a negative feature set defining an index of features saved as features data 420. Based on the index of features, controller 402 may derive a matching logic for feature identification by a machine learning technique such as, for example, one of a supervised deep learning technique or an unsupervised deep learning technique applied to the plurality of scan data and the output of the conformal-mapping model. Controller 402 may import a set of machining rules (step 510). The machining rules may comprise a set of CNC tool system 406 instructions generated, in response to the index of features, to configure the CNC tool system 406 to perform operations on identified features. The machining rules may be correlated to the positive feature set and the negative feature set defining the index of features and saved as features data 420.

In various embodiments, 3D scanning system 404 may scan a work piece such as, for example, cast airfoil 200 and generate a three dimensional scan of the cast airfoil 200 (step 512). Controller 402 may receive the three dimensional scan of the cast airfoil 200 and may register the three dimensional scan against a reference model, such as an ideal airfoil model or a nominal reference airfoil model, to obtain a reference position (step 514). Controller 402 may conformal-map the nominal model via conformal-mapping engine 412 which (with reference to steps 502 through 506) may comprise the conformal-mapping model generated in response to the plurality of scan data. Conformal-mapping engine 412 may generate a conformal-mapped nominal model of cast airfoil 200 based on the three dimensional scan of cast airfoil 200 (step 516). The conformal-mapped nominal modal of cast airfoil 200 may be stored as model data 416 in database 408 by controller 402.

Controller 402 may compare the conformal-mapped nominal model of cast airfoil 200 and the three dimensional scan of cast airfoil 200 to generate a difference map based on the comparison (step 518). The difference map may be stored as model data 416 related to the cast airfoil 200 in database 408 by controller 402. Controller 402 may classify the difference map into a positive feature set and a negative feature set (step 520). The positive feature set may describe areas of the three dimensional scan of cast airfoil 200 lying outside a surface boundary defined by the conformal-mapped nominal model of cast airfoil 200. The negative feature set may describe areas of the three dimensional scan of cast airfoil 200 lying inside the surface boundary defined by the conformal-mapped nominal model of cast airfoil 200. In this regard, the positive feature set may include regions such as encapsulations 222, casting artifacts 224, and/or other raised areas of an airfoil surface such as blade surface 220. In like manner, the negative feature set may include regions such a dimples 226 and/or concave areas of an airfoil surface such as blade surface 220.

Controller 402 may locate features of the positive feature set with respect to blade surface 220 the conformal-mapped nominal model of the cast airfoil 200 (step 522). In like regard, controller 402 may locate features of the negative feature set (step 523). Controller 402 may match the positive feature set via matching engine 410 against the index of features created in step 508 and defined by the plurality of difference maps thereby generating a matched feature set (step 524). In like regard, Controller 402 may match the negative feature set (step 525). Based on the matched feature set, controller 402 may determine for each of the features of matched feature set whether the feature falls within an acceptable design limit or whether the feature must be altered (step 526). Where no features are matched or fall within design limits the process is complete for a given cast airfoil. Controller 402 may generate tool instructions via a tool operations engine 414 (step 528). Tool operations engine 414 may generate tool instructions, such as tool paths, speed settings, and feed settings, and/or the like based on the set of machining rules and the matched feature set. In various embodiments, generating tool instructions may include generating a layered additive program (step 529). Controller 402 may transmit the tool instructions to CNC tool system 406 which may perform manufacturing operations on the cast airfoil 200 based on the tool instructions (step 530). The process may begin again by scanning the cast airfoil 200 via 3D scanning system 404 after the CNC tool system 406 completes the manufacturing operations.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

What is claimed is:

1. A method, comprising:
    receiving, by a computer based system, a three dimensional scan of a work piece;
    generating, by the computer based system, a conformal-mapped nominal model of the work piece based on the three dimensional scan and a conformal-mapping model, wherein the conformal-mapped nominal model is generated using a machine learning technique;
    comparing, by the computer based system, the three dimensional scan to a digital model of the work piece, the comparing further comprising:
        comparing, by the computer based system, the conformal-mapped nominal model with the three dimensional scan; and
        generating, by the computer based system, a difference map based on the comparison;
    identifying, by the computer based system, an area of dimensional abnormality on the work piece based on the comparison, the identifying further comprising:
        classifying, by the computer based system, the difference map into a positive feature set and a negative feature set; and
        matching, by the computer based system, the positive feature set and the negative feature set against an index of features to generate a matched feature set; and
    altering, by the computer based system, the area of dimensional abnormality on the work piece.

2. The method of claim 1, further comprising:
registering, by the computer based system, the three dimensional scan against an ideal model of the work piece;
and
storing, by the computer based system, the conformal-mapped nominal model as model data.

3. The method of claim 2, wherein the comparing to the digital model further comprises
storing, by the computer based system, the difference map as model data.

4. The method of claim 3, wherein the identifying the area of dimensional abnormality comprises
storing, by the computer based system, the matched feature set as match data.

5. The method of claim 4, wherein the altering the area of dimensional abnormality comprises:
generating, by the computer based system, a tool instruction based on the match data; and transmitting, by the computer based system, the tool instruction to a computer numerical control tool system.

6. The method of claim 5, wherein the conformal-mapping model proportionally adjusts a dimension of an ideal airfoil model.

7. A system comprising:
a processor; and
a tangible, non-transitory memory configured to communicate with the processor,
the tangible, non-transitory memory having instructions stored thereon that, in response to execution by the processor, cause the processor to perform operations comprising:
receiving, by the processor, a three dimensional scan of a work piece;
generating, by the processor, a conformal-mapped nominal model of the work piece based on the three dimensional scan and a conformal-mapping model, wherein the conformal-mapped nominal model is generated using a machine learning technique;
comparing, by the processor, the three dimensional scan to a digital model of the work piece, the comparing further comprising:
comparing, by the processor, the conformal-mapped nominal model with the three dimensional scan; and
generating, by the processor, a difference map based on the comparison;
identifying, by the processor, an area of dimensional abnormality on the work piece based on the comparison, the identifying further comprising:
classifying, by the processor, the difference map into a positive feature set and a negative feature set;
matching, by the processor, the positive feature set and the negative feature set against an index of features to generate a matched feature set; and
instructing, by the processor, a computer numerical control tool system to alter the area of dimensional abnormality on the work piece.

8. The system of claim 7, wherein the operations further comprise:
registering, by the processor, the three dimensional scan against an ideal model of the work piece;
and
storing, by the processor, the conformal-mapped nominal model as model data.

9. The system of claim 8, wherein the comparing to a digital model further comprises
storing, by the processor, the difference map as model data.

10. The system of claim 9, wherein the identifying the area of dimensional abnormality comprises
saving, by the processor, the matched feature set as match data.

11. The system of claim 10, wherein the altering the area of dimensional abnormality comprises:
generating, by the processor, a tool instruction based on the match data; and transmitting, by the processor, the tool instruction to the computer numerical control tool system.

12. The system of claim 11, wherein the conformal-mapping model proportionally adjusts a dimension of an ideal airfoil model.

13. The system of claim 8, wherein the operations further comprise deriving, by the processor, the conformal-mapping model in response to a plurality of three dimensional scan data.

14. An article of manufacture including a non-transitory, tangible computer readable storage medium having instructions stored thereon that, in response to execution by a computer based system, cause the computer based system to perform operations comprising:
receiving, by a computer based system, a three dimensional scan of a work piece;
generating, by the computer based system, a conformal-mapped nominal model of the work piece based on the three dimensional scan and a conformal-mapping model, wherein the conformal-mapped nominal model is generated using a machine learning technique;
comparing, by the computer based system, the three dimensional scan to a digital model of the work piece, the comparing further comprising:
comparing, by the computer based system, the conformal-mapped nominal model with the three dimensional scan; and
generating, by the computer based system, a difference map based on the comparison;
identifying, by the computer based system, an area of dimensional abnormality on the work piece based on the comparison, the identifying further comprising:
classifying, by the computer based system, the difference map into a positive feature set and a negative feature set and
matching, by the computer based system, the positive feature set and the negative feature set against an index of features to generate a matched feature set; and
instructing, by the computer based system, a computer numerical control tool system to alter the area of dimensional abnormality on the work piece.

15. The article of manufacture of claim 14, further comprising:
registering, by the computer based system, the three dimensional scan against an ideal model of the work piece;
and
storing, by the computer based system, the conformal-mapped nominal model as model data.

16. The article of manufacture of claim 15, wherein the comparing to a digital model further comprises
storing, by the computer based system, the difference map as model data.

17. The article of manufacture of claim 16, wherein the identifying the area of dimensional abnormality comprises saving, by the computer based system, the matched feature set as match data.

18. The article of manufacture of claim 17, wherein the altering the area of dimensional abnormality comprises:
   generating, by the computer based system, a tool instruction based on the match data; and
   transmitting, by the computer based system, the tool instruction to the computer numerical control tool system.

19. The article of manufacture of claim 18, wherein the conformal-mapping model proportionally adjusts a dimension of an ideal airfoil model.

20. The article of manufacture of claim 15, wherein the operations further comprise deriving, by the computer based system, the conformal-mapping model in response to a plurality of three dimensional scan data.

* * * * *